Patented Mar. 10, 1925.

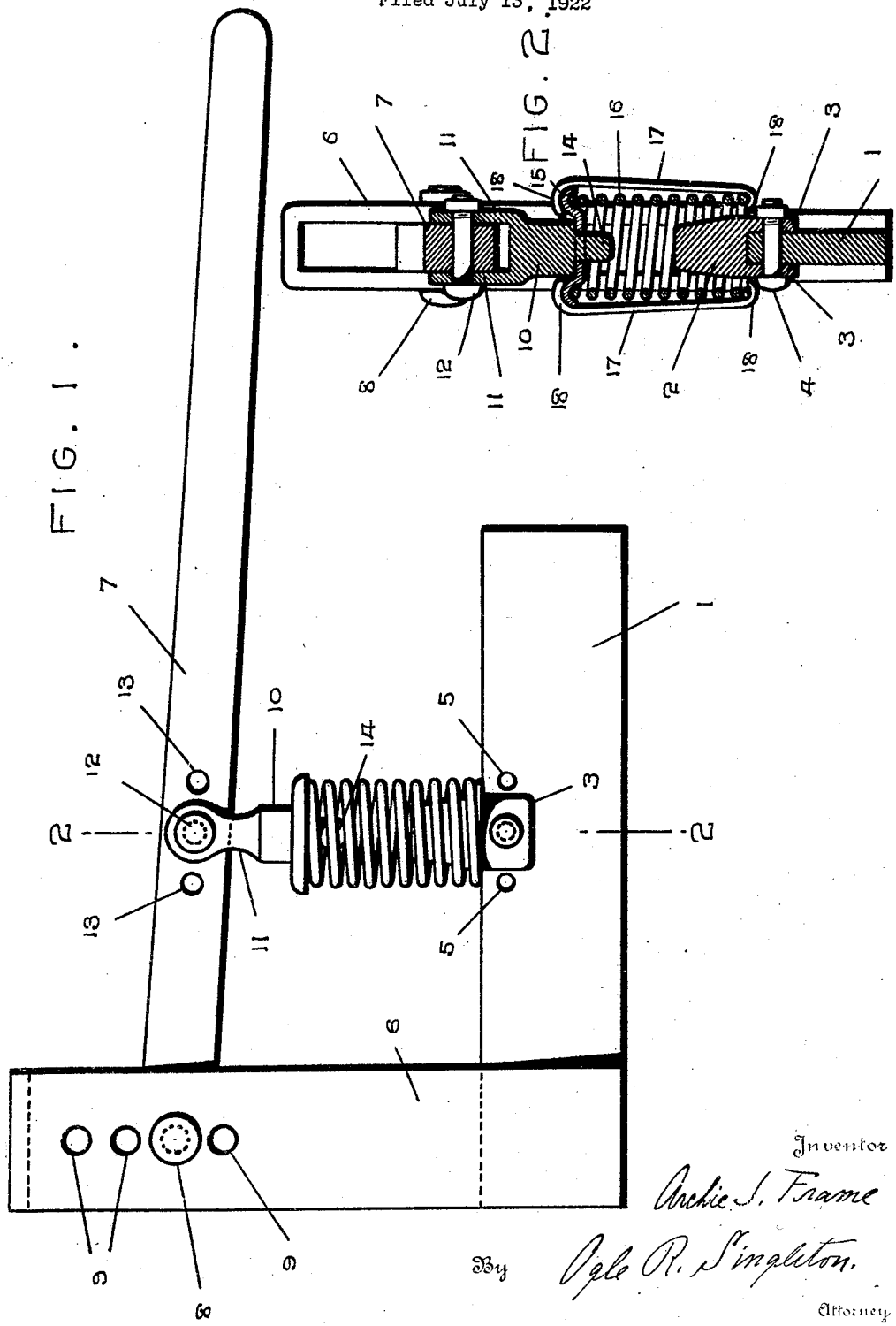

1,529,476

UNITED STATES PATENT OFFICE.

ARCHIE J. FRAME, OF MIAMI, FLORIDA.

SPRING COMPRESSOR.

Application filed July 13, 1922. Serial No. 574,707.

*To all whom it may concern:*

Be it known that I, ARCHIE J. FRAME, a citizen of the United States, residing at Miami, in the county of Dade and State of Florida, have invented certain new and useful Improvements in Spring Compressors, of which the following is a specification.

My invention consists in a new and useful improvement in spring compressors and is designed to provide a simple and efficient tool for use in compressing valve springs when they are to be placed upon the valve stems of an explosive engine. While this is the particular use for which my device is adapted it will be understood that I do not consider my invention limited to the accomplishment of this specific purpose but refer for its scope to the claims appended hereto.

In the drawings:

Fig. 1 is a side elevation of my device.

Fig. 2 is a vertical section on the line 2—2 of Fig. 1.

My device is provided with a bar 1 which may be attached in any suitable manner to a work bench or other support, and forms the rest upon which the springs to be compressed may be seated. A frusto-conical stud 2 has jaws 3 which enclose the upper edge of the bar 1 and are pinned thereto by a bolt 4 which is passed through any one of a series of holes 5 in the bar 1. A yoke 6 is suitably attached at one end of the bar 1 and extends upwardly therefrom. A lever 7 is pivoted in the upper end of the yoke 6 by a bolt 8 passed through two holes 9 in the arms of the yoke 6. Several sets of holes 9 are provided to permit adjustment of the lever 7 relative to the bar 1.

A head 10 is provided with jaws 11 enclosing the lever 7 and pinned thereto by a bolt 12 passed through any one of a series of holes 13. The head 10 is provided with a centrally disposed stud 14 which enters the hole in the center of the cap 15 of the spring 16 when the spring 16 is placed upon the bar 1, surrounding the stud 2, and the lever 7 is moved downwardly toward the bar 1. Pressure upon the lever 7 causes the head 10 to bear upon the cap 15 thus compressing the spring 16 against the bar 1 upon which it rests, being held in place by the stud 2. When proper compression has been secured, clips 17 having hooks 18 upon their ends, may be affixed to the spring 16, the hooks 18 grasping the edges of the cap 15 and the end of the spring 16, thus holding the spring compressed. The lever 7 may then be raised, removing the stud 14 from the cap 15 and the compressed spring 16 may be slipped off of the stud 2 and is ready for insertion into its proper place upon the valve stem.

It will be noted that by providing a series of holes 5 and 13, the guide stud 2 and the head 10 are adjustable relative to the fulcrum yoke 6 of the lever 7, thus permitting variation in the leverage. This means of adjustment as well as the means of adjusting the lever 7 relative to the bar 1 is provided to permit the use of my device for compressing springs of widely differing sizes and degrees of resiliency. It will be obvious that I may provide several heads 10 of different diameters to correspond with springs of different diameters.

Having described my invention, what I claim is:

1. A spring compressor comprising a base bar, a yoke attached to said bar; a lever pivoted in said yoke; and a presser head pivoted to said lever in axial alignment with said bar.

2. A spring compressor comprising a base bar, a guide stud mounted on said bar, a lever pivotally mounted on said bar, and a presser head mounted on said lever, said stud and head being in axial alignment.

3. In a spring compressor, the combination of a base bar; a guide stud adjustably mounted on said bar; a yoke attached to said bar; a lever adjustably pivoted in said yoke; a presser head adjustably pivoted in said lever in axial alignment with said stud and adapted to confine a coil spring between itself and said bar when said lever is rocked.

In testimony whereof I affix my signature.

ARCHIE J. FRAME.